US012442595B2

(12) United States Patent
Sheikh

(10) Patent No.: US 12,442,595 B2
(45) Date of Patent: Oct. 14, 2025

(54) FILAMENT DRYER

(71) Applicant: SnoLab Inc., Suffern, NY (US)

(72) Inventor: Noman Sheikh, Suffern, NY (US)

(73) Assignee: SnoLab Inc., Suffern, NY (US)

( * ) Notice: Subject to any disclaimer, the term of this patent is extended or adjusted under 35 U.S.C. 154(b) by 806 days.

(21) Appl. No.: 17/479,030

(22) Filed: Sep. 20, 2021

(65) Prior Publication Data

US 2023/0090184 A1    Mar. 23, 2023

(51) Int. Cl.
| | |
|---|---|
| *F26B 21/10* | (2006.01) |
| *B29C 64/118* | (2017.01) |
| *B29C 64/314* | (2017.01) |
| *B29C 64/386* | (2017.01) |
| *B33Y 40/10* | (2020.01) |
| *B33Y 50/00* | (2015.01) |
| *F26B 13/00* | (2006.01) |

(Continued)

(52) U.S. Cl.
CPC ............ *F26B 21/10* (2013.01); *B29C 64/118* (2017.08); *B29C 64/314* (2017.08); *B29C 64/386* (2017.08); *B33Y 40/10* (2020.01); *B33Y 50/00* (2014.12); *F26B 13/003* (2013.01); *F26B 21/004* (2013.01); *F26B 25/12* (2013.01)

(58) Field of Classification Search
CPC ........ F26B 13/001; F26B 3/002; F26B 3/003; F26B 21/10; F26B 21/004; F26B 25/12; F26B 3/04; B29C 64/118; B29C 64/314; B29C 64/386; B29C 64/295; B29C 64/364; B29C 64/393; B29C 64/255; B33Y 40/10; B33Y 50/00; B33Y 30/00; B33Y 50/02
See application file for complete search history.

(56) References Cited

U.S. PATENT DOCUMENTS

2011/0013892 A1*    1/2011    Ragay .................. H05B 3/0076
                                                                    392/422

FOREIGN PATENT DOCUMENTS

| CN | 111649713 A | * | 9/2020 | ............. G01B 21/32 |
| DE | 3202923 C2 | * | 10/1990 | |
| KR | 101848058 B1 | * | 4/2018 | |

OTHER PUBLICATIONS

Translation DE-3202923-C2 (Year: 1990).*
Translation KR-101848058-B1 (Year: 2018).*
Translation CN-111649713-A (Year: 2020).*

* cited by examiner

*Primary Examiner* — Jessica Yuen

(74) *Attorney, Agent, or Firm* — Meister Seelig & Fein PLLC

(57) ABSTRACT

An apparatus for heating three-dimensional printing filaments comprising a heating chamber including an insulation lining and spool holders mounted at a base of the heating chamber, a heater fan assembly mounted above the heating chamber, wherein the heater fan assembly comprises a powered fan and heater configured to heat air and circulate the heated air to the heating chamber, and a diverter situated between the heater fan assembly and the heating chamber, wherein the diverter splits and directs the heated air to the heating chamber through a pair of channels. The apparatus further comprising a plurality of exhaust ports at top sidewall portions and bottom sidewall portions of the heating chamber, wherein the plurality of exhaust ports allowing the heated air to escape from the heating chamber, and fitting adapters comprising apertures that allow filament material to be dispensed from the heating chamber.

10 Claims, 13 Drawing Sheets

(51) Int. Cl.
*F26B 21/00* (2006.01)
*F26B 25/12* (2006.01)

FILAMENT DRYER

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

Field of the Invention

This application generally relates to a dryer device, and in particular, a dryer system for drying and storing 3D printing filaments.

Description of the Related Art

Fused deposition modeling is a three-dimensional (3D) printing technique where layers of 3D printing filament are extruded and deposited layer by layer to create a 3D object. The 3D printing filament may include material, such as thermoplastic, nylon, polycarbonate, carbon fiber, or polypropylene, that is produced into a continuous thread and is typically spooled into a reel for storage and printer feeding. 3D printing filaments can be degraded by moisture if left out in open air, yielding poor print quality and fragile parts. That is because 3D printing filaments tend to attract moisture from the air via adsorption. Adsorption is a phenomenon where gas or liquid matter (water in this case) occurs on the surface of a solid substance on account of weak an der Waals forces. The 3D printing filament slowly adsorbs moisture which ruins the integrity of the material. Specifically, polymers in 3D printing filaments break down, in a process known as hydrolysis, when the moisture in the 3D printing filaments is heated at the point of extrusion.

As such, maintaining dry 3D printing filaments should be ensured to achieve optimal performance and quality of prints. Existing solutions include repurposing food dehydrators, however, these devices are not intended to be used for and do not provide ideal drying conditions for drying 3D printing filaments. Specifically, food dehydrators do not achieve necessary temperatures for drying 3D printing filaments and exhibit temperature gradients within the heating chamber. Certain 3D printing filament materials can be over dried, such as in the case of nylon, it can become unusable. 3D printing filaments require a certain amount of moisture to remain in a stable state. There is thus a need for a device that is able to maintain 3D printing filaments in an ideal environment.

SUMMARY OF THE INVENTION

The present invention provides an apparatus and system for heating three-dimensional printing filaments. According to one embodiment, the apparatus comprises a heating chamber including an insulation lining and spool holders mounted at a base of the heating chamber, a heater fan assembly mounted above the heating chamber, wherein the heater fan assembly comprises a powered fan and heater configured to heat air and circulate the heated air to the heating chamber, and a diverter situated between the heater fan assembly and the heating chamber, wherein the diverter splits and directs the heated air to the heating chamber through a pair of channels. The apparatus further comprises a plurality of exhaust ports at top sidewall portions and bottom sidewall portions of the heating chamber, wherein the plurality of exhaust ports allowing the heated air to escape from the heating chamber, and fitting adapters comprising apertures that allow filament material to be dispensed from the heating chamber.

The apparatus may further comprise a computing device configured to control operations of the heater fan assembly. The computing device may also be configured to utilize and operate the heater fan assembly to heat the air and maintain an air temperature within the heating chamber at a given configurable temperature based on a material setting. The apparatus may further comprise a touch screen that allows user interaction with the computing device to control heating modes and the operation of the heater fan assembly. The touch screen may be configured to present a graphical user interface including at least one of presets, dryer status, countdown timer, current and setpoint temperature, and a logo.

The heater fan assembly may also include a replaceable air filter. The apparatus may further comprise a dryer door that provides access to the heating chamber. The apparatus may also include an interlock that toggles activation of the heater fan assembly based on a configuration of the dryer door. In one embodiment, the diverter may split and direct the heated at an outwards angle towards sidewalls of the heating chamber. The diverter may be triangularly-shaped or angularly slanted.

According to one embodiment, the system comprises a heater fan unit, a heating chamber coupled to the heater fan unit, the heating chamber including a door, a processor, and a memory having executable instructions stored thereon that when executed by the processor cause the processor to receive a command, wherein the command includes a selection of a material preset or setting including drying parameters for a given filament material, toggle activation of the heater fan unit based on a position of the door, detect a temperature within the heating chamber, determine whether a holding condition exists based on the received command and the detected temperature, and control operation of the heater fan unit based on the determination of whether the holding condition exists.

The processor may be further configured to determine whether a holding condition exists by comparing the detected temperature of the heating chamber and a duration in which the heating chamber was maintained at the detected temperature of the heating chamber with the drying parameters. The drying parameters may include a heating temperature and time for drying the given filament material and hold cycles. The system may further comprise a touch screen configured to communicate the command to the processor. In one embodiment, the system further comprises thermistors configured to provide temperature readings of the heating chamber to the computing device. The processor may be further configured to energize the heater fan unit in an active cycle. The processor may also be configured to operate the heater fan unit according to pre-defined active temperature, active time, hold temperature, and hold time that are stored in a preset memory. The processor may also be configured to deactivate the heater fan unit in a hold cycle. The processor may also be configured to operate the heater fan unit according to user-defined active temperature, active time, hold temperature, and hold time.

BRIEF DESCRIPTION OF THE DRAWINGS

The invention is illustrated in the figures of the accompanying drawings which are meant to be exemplary and not limiting, in which like references are intended to refer to like or corresponding parts.

DETAILED DESCRIPTION OF THE INVENTION

Figure 1:
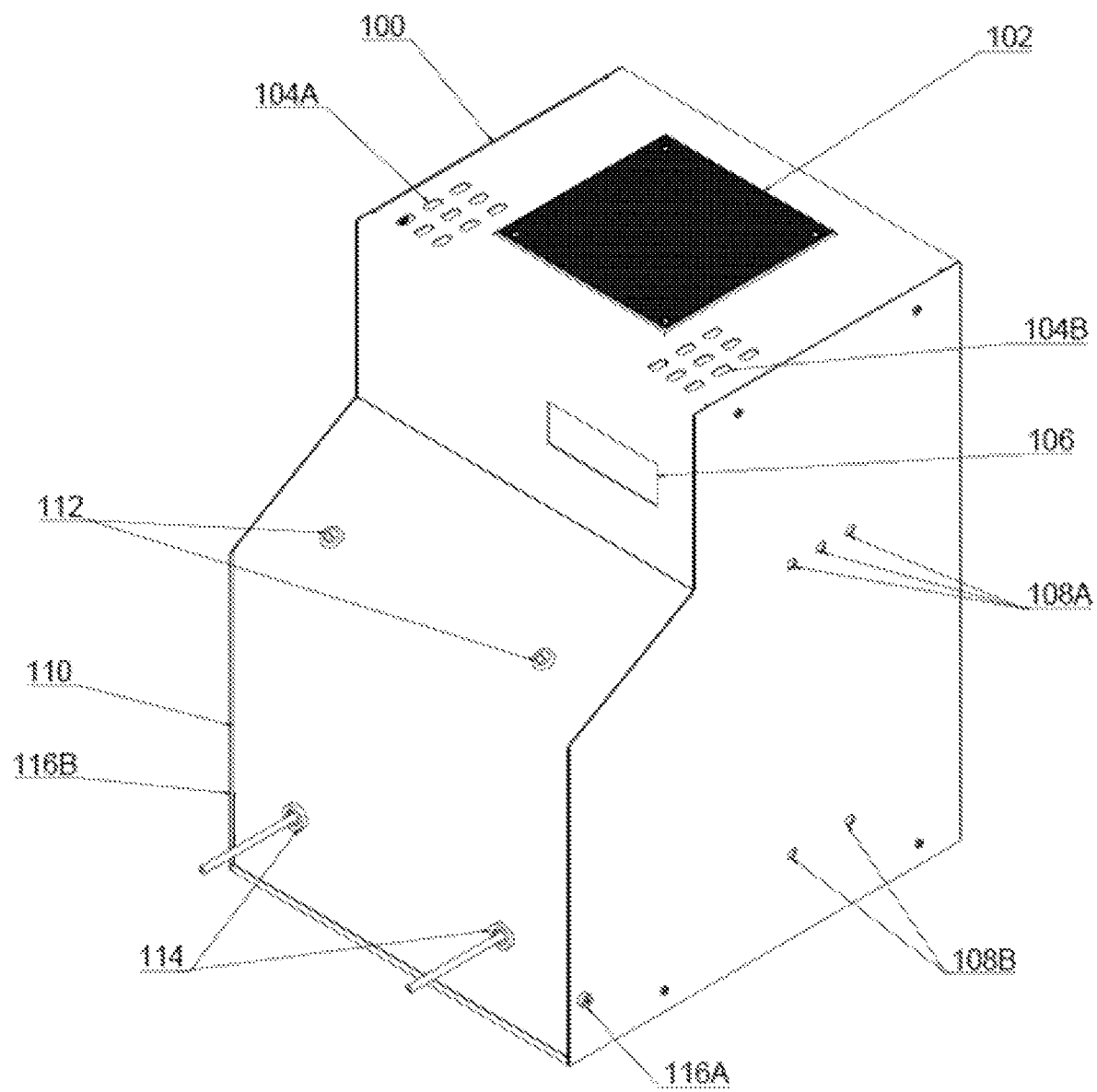
FIG. 1 illustrates a perspective view of a filament dryer in a closed configuration according to an embodiment of the present invention.

Subject matter will now be described more fully hereinafter with reference to the accompanying drawings, which form a part hereof, and which show, by way of illustration, exemplary embodiments in which the invention may be practiced. Subject matter may, however, be embodied in a variety of different forms and, therefore, covered or claimed subject matter is intended to be construed as not being limited to any example embodiments set forth herein; example embodiments are provided merely to be illustrative. It is to be understood that other embodiments may be utilized and structural changes may be made without departing from the scope of the present invention. Likewise, a reasonably broad scope for claimed or covered subject matter is intended. Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

The present application discloses a filament dryer for drying and storing 3D printing filaments in a controlled heated environment to reverse and reduce van der Waals forces from attracting moisture on the surface of the filament material. Filament drying can be defined by a relation of heat and time. The more heat that is applied, the faster the filament material will dry, however, this comes at the cost of potentially degrading the filament. According to one embodiment, the filament dryer comprises a heating chamber and a computing device that controls the heating chamber to dry 3D printing filaments with minimal heating temperatures over an adequate amount of drying time. The computing device may control the heating chamber according to two heating cycles—an active cycle and a hold cycle. During the active cycle, van der Waals forces can be broken using higher heat for a short duration, and during the hold cycle, dryness can be maintained at a lower temperature but higher than the ambient temperature to reduce the number of van der Waals forces from occurring. As such, the filament dryer may operative in an active cycle where the temperature is greater to dehydrate the environment and then switch to a lower temperature hold cycle that is higher than the ambient room temperature so the adsorption rate decreases. The filament dryer may further comprise an air circulation system that evenly heats the chamber and forces a majority of moisture from intake air out of the chamber while maintaining some moisture in the chamber to keep the filament material at its peak performance.

Figure 2:
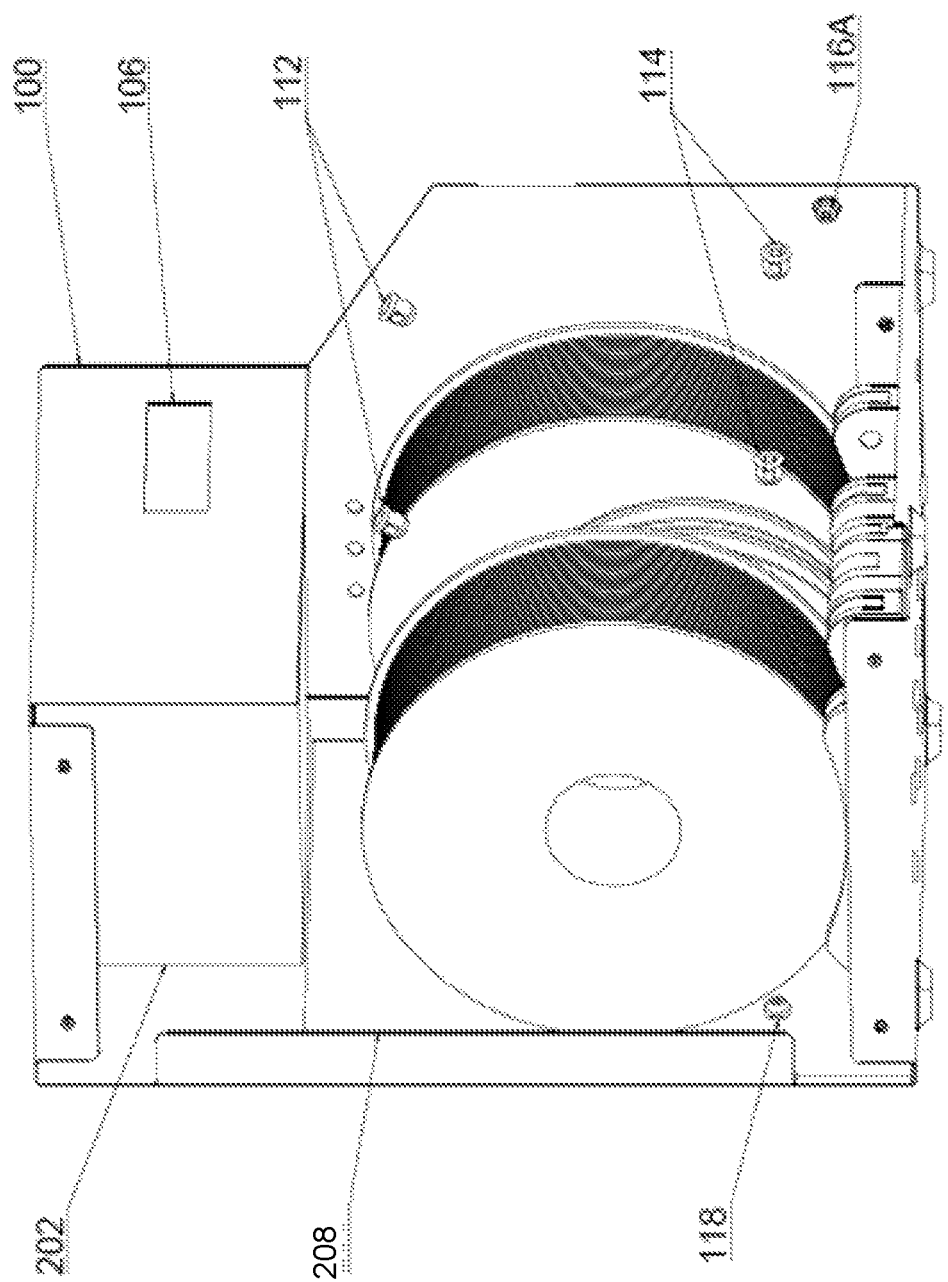
FIG. 2 illustrates an exposed right side view of a filament dryer in a closed configuration according to an embodiment of the present invention.

FIGS. 1 and 2 present views of a filament dryer in a closed configuration according to an embodiment of the present invention. The filament dryer comprises a dryer system 100, heater intake fan grille 102, electronics intake fan grille 104A and 104B, touch screen 106, top exhaust ports 108A, bottom exhaust ports 108B, dryer door 110, bowden fitting adapters 112, 114, 118, and door pins 116A and 116B. The dryer system 100 includes a casing that may be constructed from metal, such as steel, aluminum, or any other metallic alloy. The heater intake fan grille 102 comprises holes or meshing that allow air to be drawn into heater fan assembly 202 and prevent finger pinching or bodily harm. Electronics intake fan grille 104A and 104B comprise holes or meshing that allow air to be drawn into an internal electronics fan (not illustrated) and also finger pinching or prevent bodily harm.

Heater fan assembly 202 comprises a powered fan and heater that is mounted above a heating chamber 208. The heater fan assembly 202 may be configured to heat air and circulate the heated air within the heating chamber 208. Top exhaust ports 108A and bottom exhaust ports 108B may be situated at top sidewall portions and bottom sidewall portions of the heating chamber 208 on the left side of dryer system 100 to allow air circulated by heater fan assembly 202 to escape from the heating chamber 208. A set of exhaust ports identical to top exhaust ports 108A and bottom exhaust ports 108B also reside on the right side of the dryer system 100.

The heater fan assembly 202 may be controlled by a computing device having a central processing unit or microcontroller and a memory unit having executable instructions stored therein. The executable instructions may be executed by the computing device to utilize and operate the heater fan assembly 202 to heat the air within heating chamber 208 and maintain an air temperature within heating chamber 208 at a given configurable temperature (e.g., based on filament material setting) to remove moisture from and prevent moisture accumulation on filaments held in filament spools 204 and 206. The heated air may be diverted through channels to properly circulate the air laterally within the chamber to eliminate temperature gradients within heating chamber 208. The heater fan assembly 202 is capable of heating the heating chamber 208, for example, up to 95° C., and withstand long duty cycles. The heater fan assembly 202 is also capable of maintaining a stable hold temperature of, for example, up to 75° C. for long duty cycles. The dryer system 100 may further include an interlock thermostat that de-energizes a heater component of heater fan assembly 202 when, for example, the temperature within heating chamber 208 exceeds 95° C.-107° C. The dryer system 100 may further include an interlock fuse that cuts power to the heater fan assembly 202 when the temperature within the heating chamber 208 exceeds, for example, 107° C.-137° C. or if the heater fan assembly 202 draws power that exceeds a given threshold.

Touch screen 106 comprises a display device that allows a user to interact with the computing device or electronic circuitry of the dryer system 100, such as a capacitive touch screen, by touching areas on the touch screen 106. The touch screen 106 may allow for a seamless user experience with a graphical user interface that is presented for a user to control heating modes and operation of the heater fan assembly 202. According to one embodiment, the graphical user interface may provide selected presets, dryer status (e.g., active, hold, off), manual operation, countdown timer, current and set-point temperature, configurations/settings, and a logo. A user may use touch screen 106 to set the active temperature, active time, hold temperature, and hold time. The active temperature and active time may comprise parameters for an active cycle where dryer system 100 is operated at a higher heat with a short duration to quickly break off van der Waals forces while preventing degradation of the material being dried. The hold temperature and hold time may comprise parameters for a hold cycle where dryer system 100 is operated at a lower heat (but higher than ambient, e.g., 50° C.) with a higher duration, for example, while a 3D printer is printing a model or between prints. The touch screen 106 may also be used to access a diagnostics screen to test key safety features, check firmware version, and modify defaults such as hold temperature and hold time.

Door pins 116A and 116B comprise hinge mechanisms that allow dryer door 110 to open and close along a pivot. Opening the dryer door 110 allows access to heating chamber 208 and filament spools 204 and 206 stored within the heating chamber 208. Bowden fitting adapters 112, 114, and 118 may comprise apertures that can be configured to dispense filament from the filament spools 204 and 206 for active use while printing. That is, filament may be stored in and dispensed to a 3D printer from the dryer system 100. The bowden fitting adapters 112, 114, and 118 may comprise one-touch fittings with frictionless filament feedings. In certain embodiments, dryer door 110 may be secured in a closed configuration with a latching lock including an interlock for ensuring that the dryer door 110 is closed in order for (toggling) the heater fan assembly 202 to activate. The latching lock may comprise a magnetic reed switch that detects whether the dryer door 110 is closed and de-energizes heater fan assembly 202 when the dryer door 110 is not closed or locked. Power to electrical components within dryer system 100, such as heater fan assembly 202, the processor or controller, and touch screen 106 may be provided a power supply. The power supply may be power sensing and switching to support 90-264 alternating current voltage from an outlet via a power cord.

Figure 3:
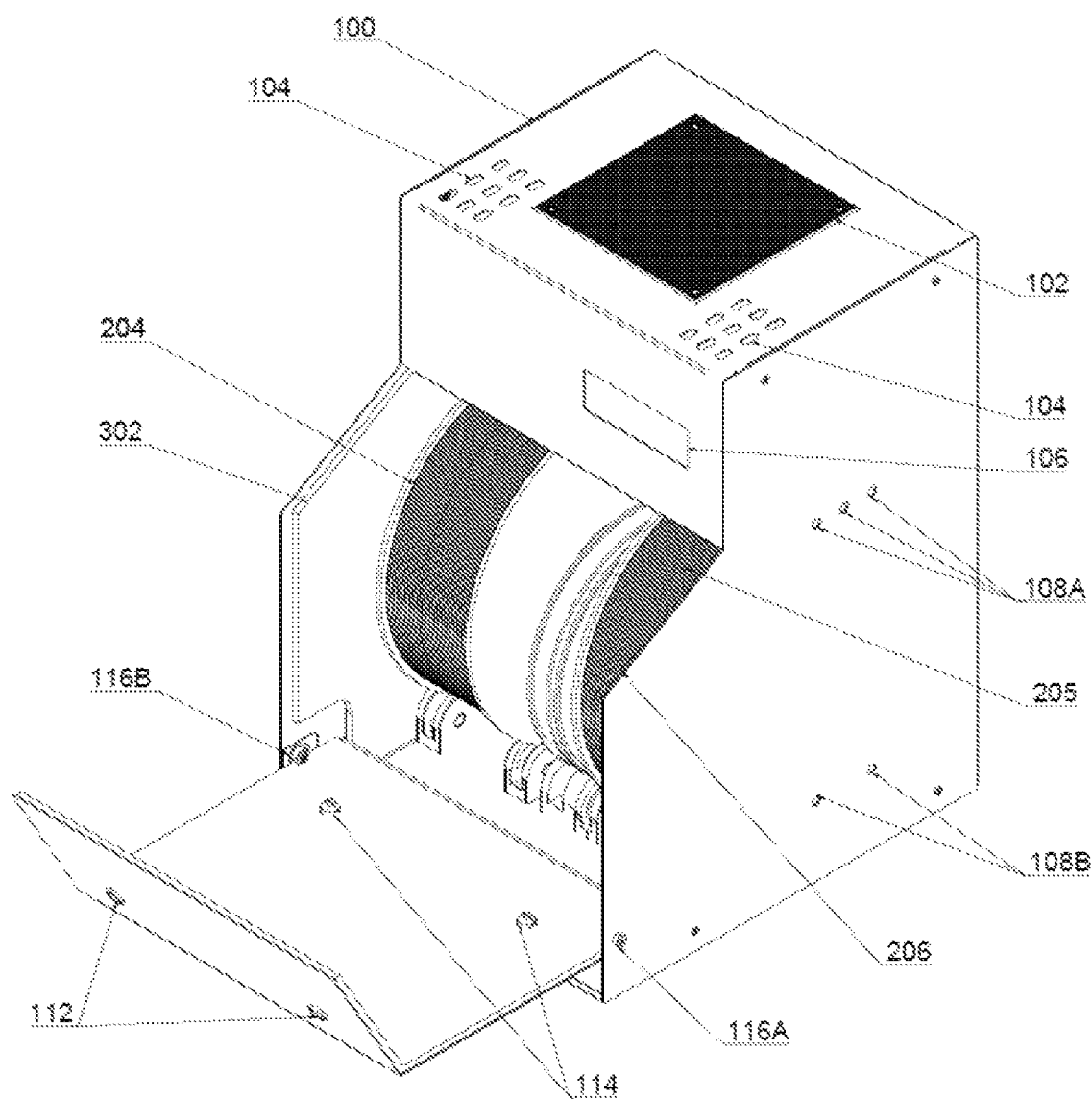
FIG. 3 illustrates a perspective view of a filament dryer in an open configuration according to an embodiment of the present invention.

FIG. 3 presents a perspective view of a 3D printing filament dryer in an open configuration according to an embodiment of the present invention. Heating chamber 208 comprises insulation lining 302 that lines and encapsulates heat produced by heater fan assembly 202. Towpreg 304 may also be stored within heating chamber 208 adjacent to filament spools 204 and 206.

Figure 4:
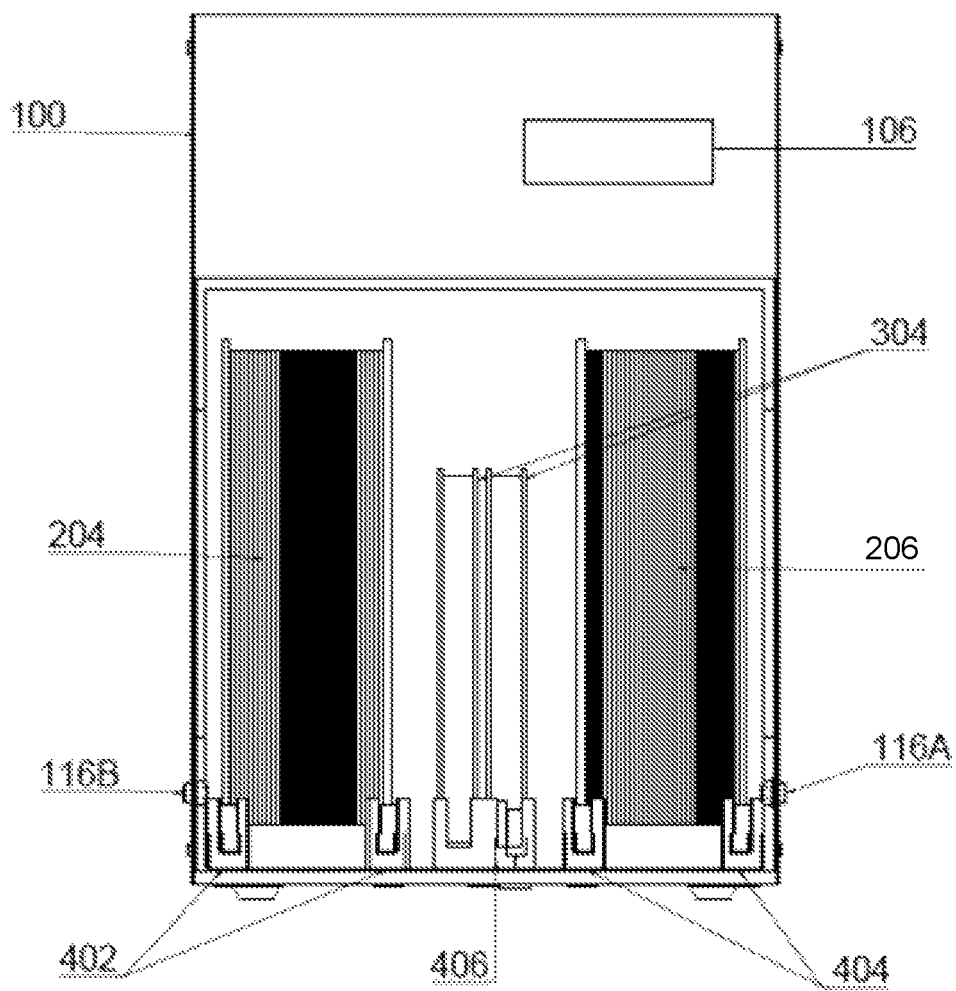
FIG. 4 illustrates a front view of a filament dryer in an open configuration according to an embodiment of the present invention

FIG. 4 presents a front view of a 3D printing filament dryer in an open configuration according to an embodiment of the present invention. Dryer system 100 includes a slide-in design that enables ease of access with enough space for spool holders 402 and 404 that can hold, for example, two one kilogram filament rolls, and towpreg holders 406 that can hold, for example, two rolls of tape. Spool holders 402 and 404 may be mounted at a bottom or base of the heating chamber 208. Filament rolls may be loaded on spool holders 402 and 404 without unraveling. Optionally, towpreg holders 406 may be removed to may space for larger filament rolls, e.g., 2.2 kilogram rolls.

Figure 5:
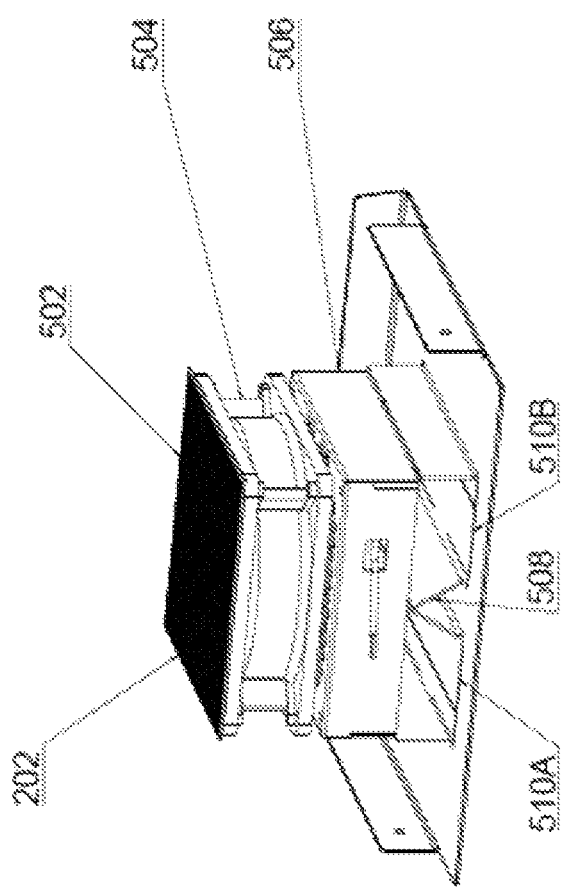
FIG. 5 illustrates a heater fan assembly of a filament dryer according to an embodiment of the present invention.

FIG. 5 presents a heater fan assembly of a 3D printing filament dryer according to an embodiment of the present invention. Heater fan assembly 202 is mounted on a top portion within heating chamber 208. The heater fan assembly 202 comprises a fan unit 504 and a heater 506. A replaceable air filter 502 is attached to fan unit 504 to prevent dust and other particles from contaminating the heating chamber 208. The fan unit 504 may pull air through the air filter 502 and feed the filtered air downwards towards the heater 506. The air may be heated by heater 506 and pass downwards through a diverter 508 between the heater 506 and heating chamber 208. The diverter 508 splits and directs the heated air into channels 510A and 510B. Splitting the heated air provides for even heating and air circulation which is described in further detail with respect to the description of FIG. 12.

Figure 6:
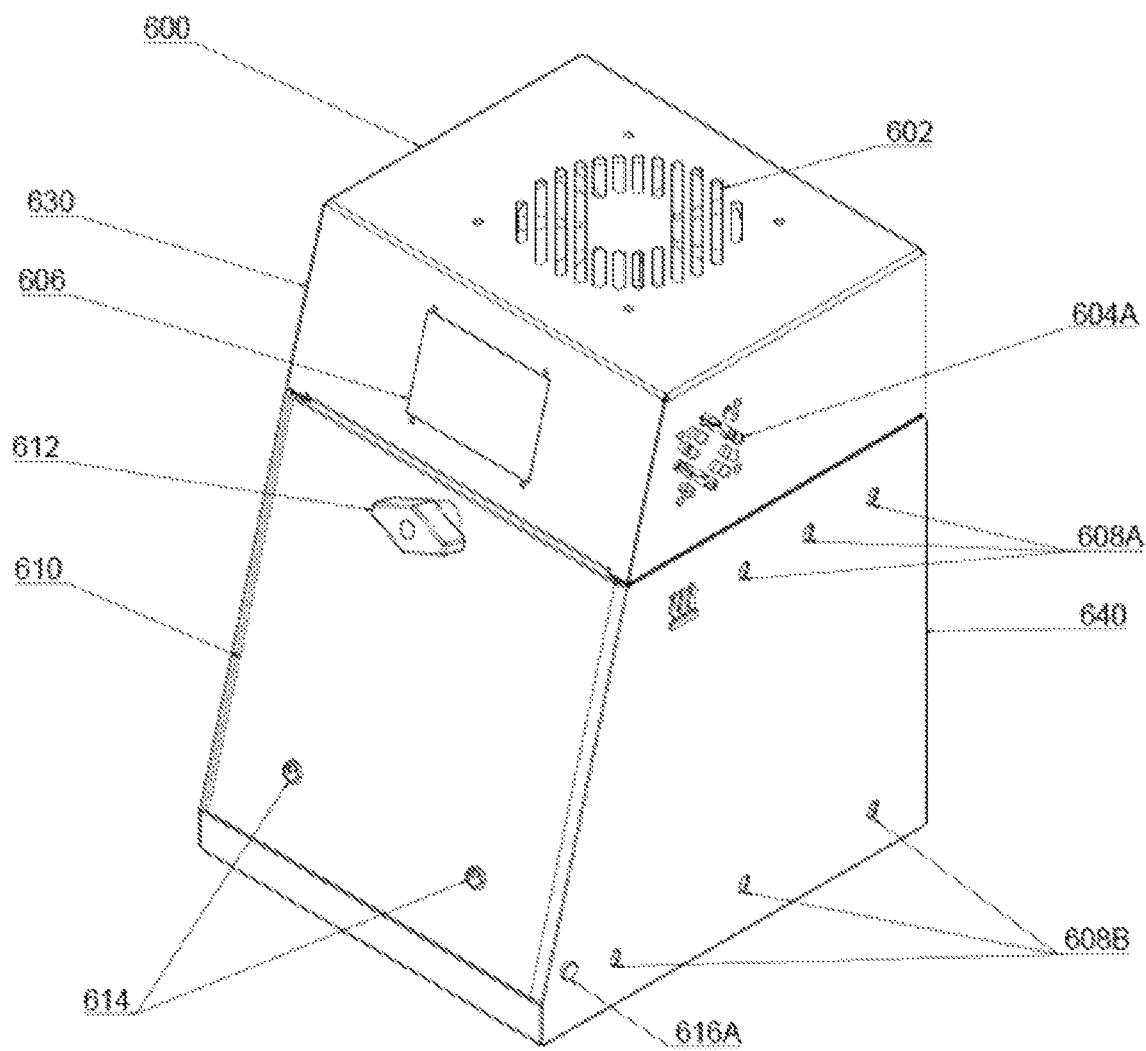
FIG. 6 illustrates a perspective view of the front, left, and top sides of a filament dryer in a closed configuration according to an embodiment of the present invention.
Figure 7:
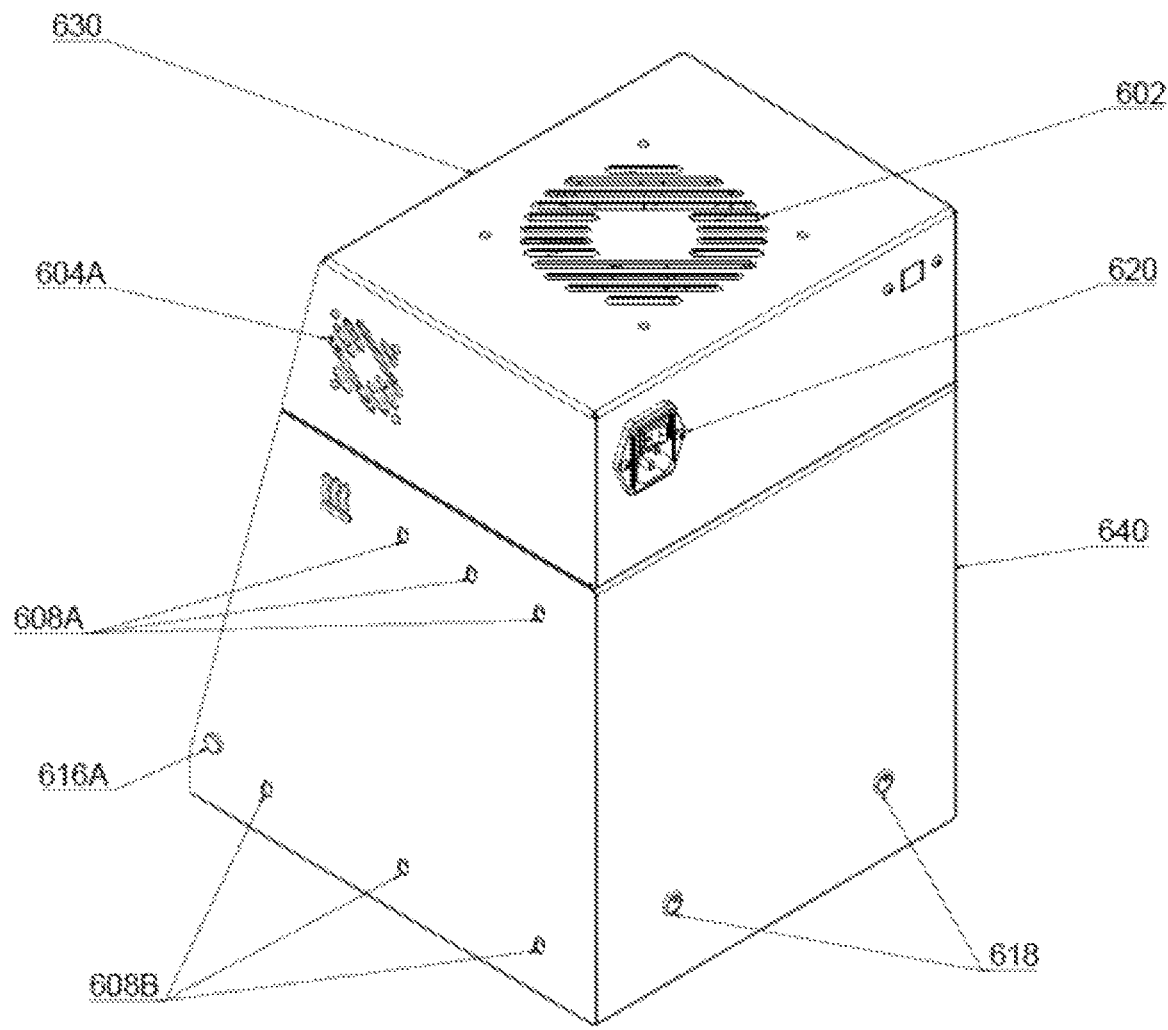
FIG. 7 illustrates a perspective view of the rear, left, and top sides of a filament dryer in a closed configuration according to an embodiment of the present invention.
Figure 8:
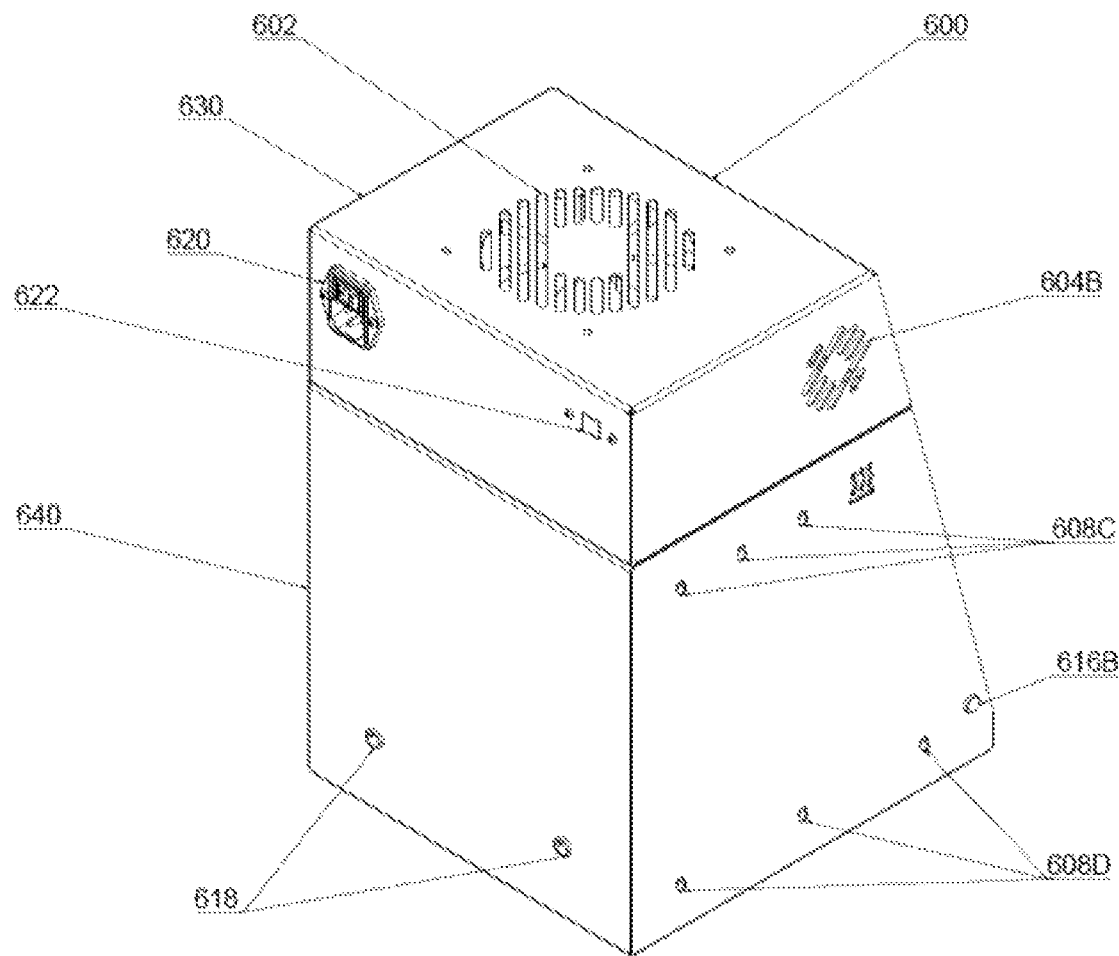
FIG. 8 illustrates a perspective view of rear, right, and top sides of a filament dryer in a closed configuration according to another embodiment of the present invention.

FIGS. 6 through 8 present views of a filament dryer in a closed configuration according to another embodiment of the present invention. Functionality and like components of dryer system 600 may be identical to corresponding ones of dryer system 100. The filament dryer comprises a dryer system 600 including a top assembly 630 and a bottom assembly 640. The top assembly 630 includes heater intake fan grille 602, electronics intake fan grille 604A and 604B, touch screen 606, power inlet 620, and a universal serial bus ("USB") adapter 622. The top assembly 630 further includes a heater fan unit and a processor/controller that controls operation of the heater fan assembly.

Power inlet 620 comprises a receptacle for delivering power to the heater fan unit, the processor/controller, USB adapter 622, and touch screen 606. USB adapter 622 can be configured to accept firmware updates. The USB adapter 622 may be further configured to connect with a computer or a controller device. The bottom assembly 640 includes top exhaust ports 608A, 608C, bottom exhaust ports 608B, 608D, dryer door 610, door latch 612, bowden fitting adapters 614, 618, and door pins 616A, 616B.

Figure 9:
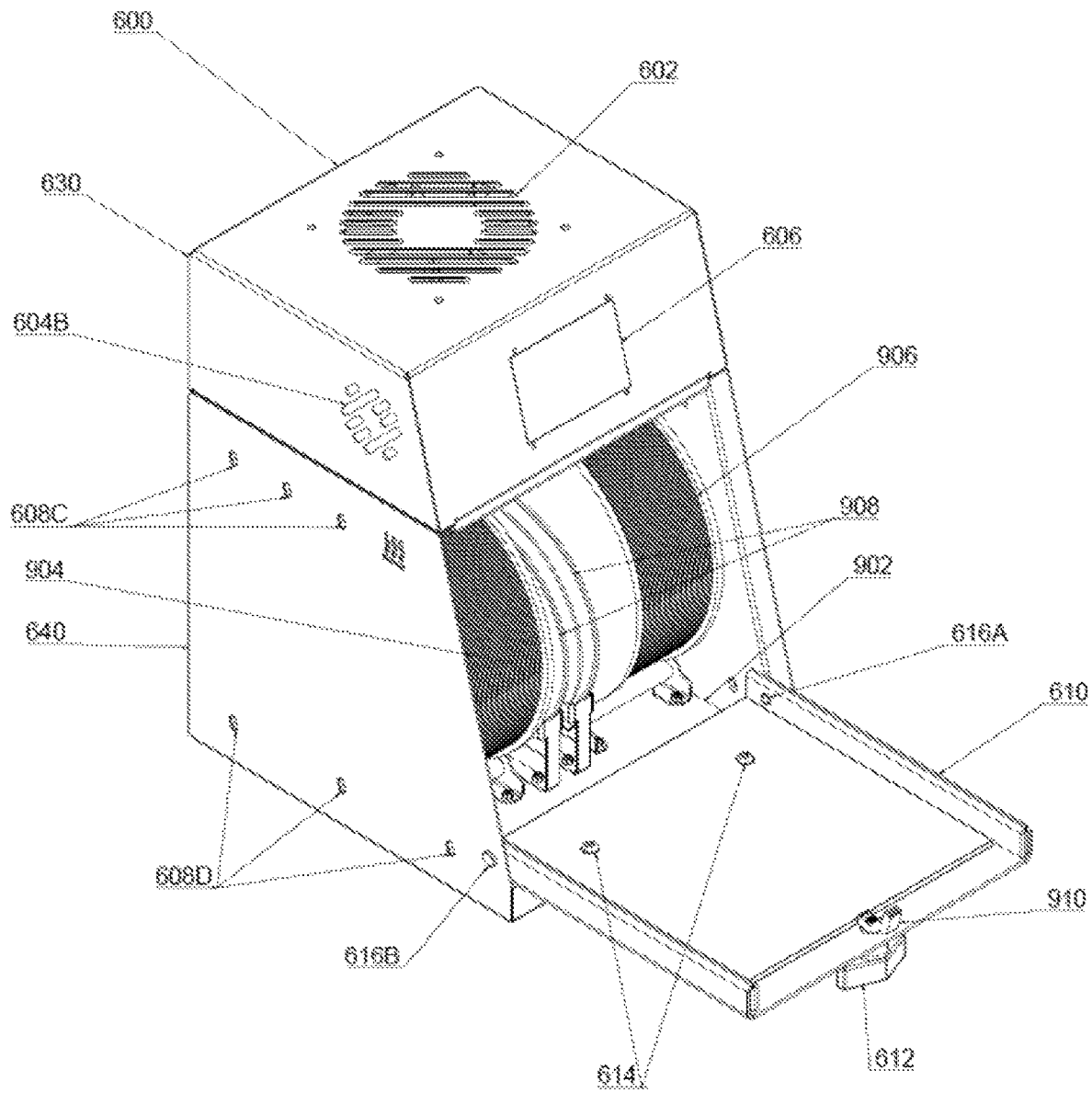
FIG. 9 through 11 illustrates a filament dryer in an open configuration according to an embodiment of the present invention.
Figure 10:
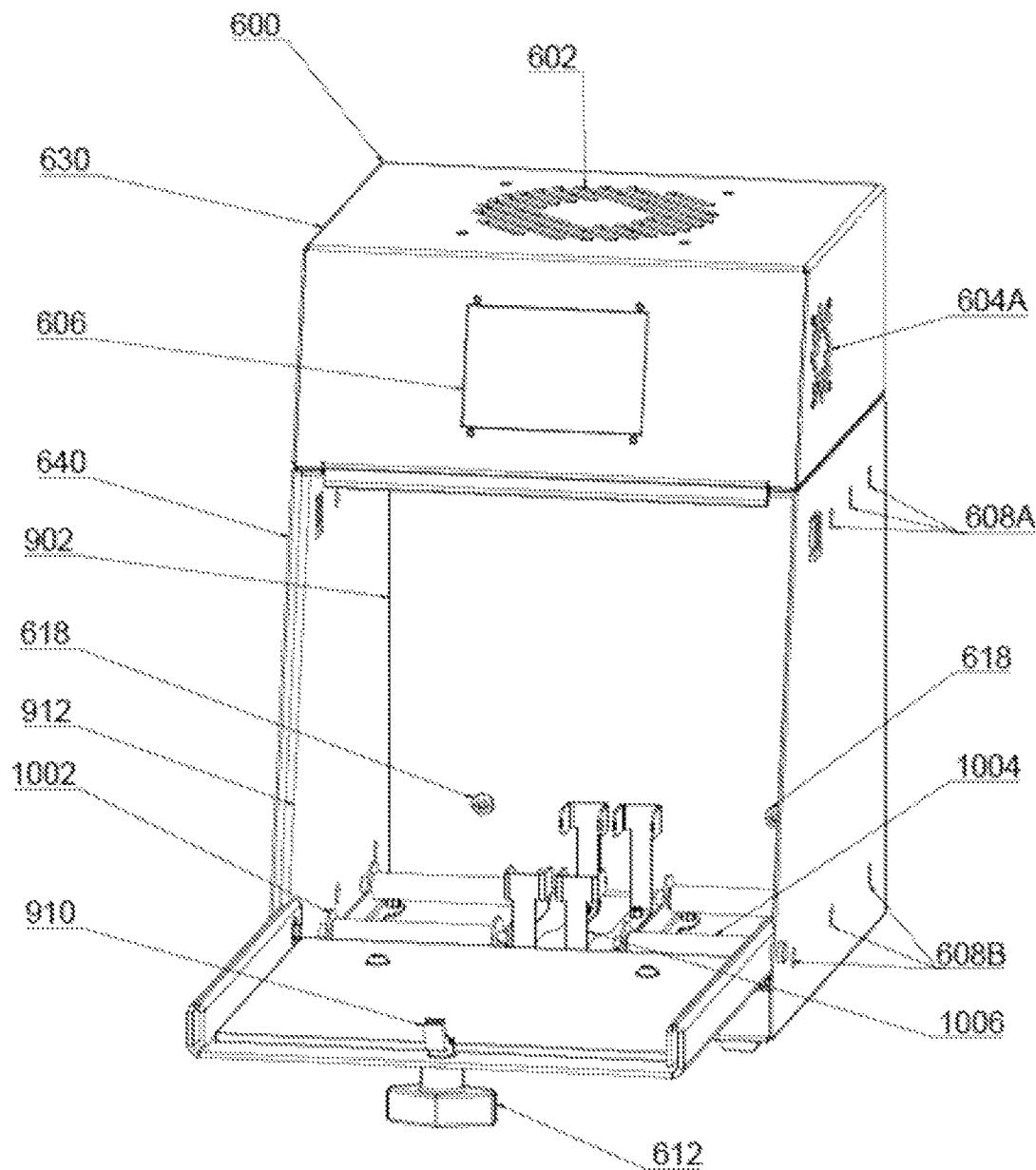
Figure 11:
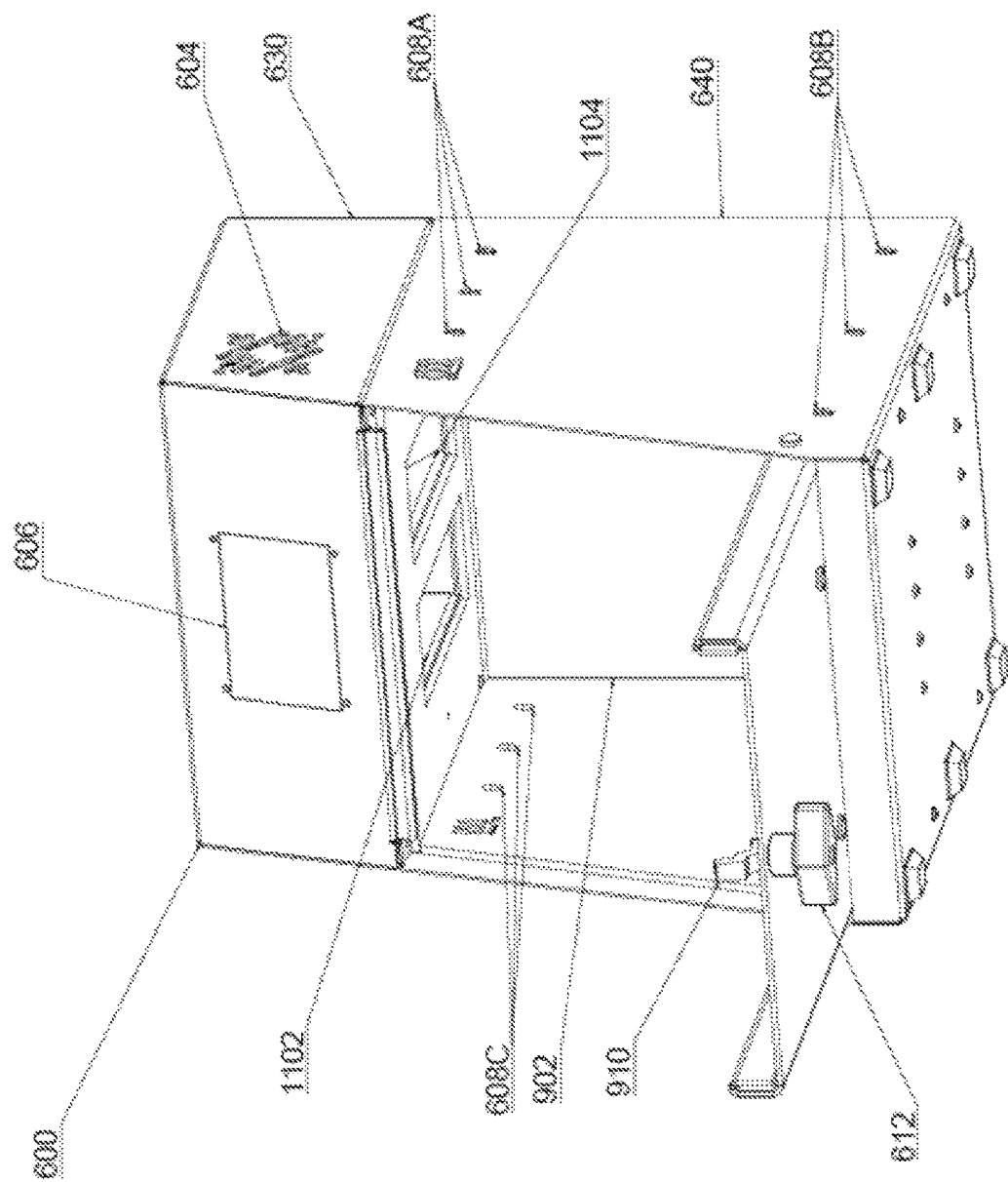

FIGS. 9 through 11 present the filament dryer in an open configuration according to an embodiment of the present invention. Door pins 616A and 616B comprise hinge mechanisms that allow dryer door 610 to open and close along a pivot. Dryer door 610 may be opened by operating door latch 612 to release lock 910. Opening the dryer door 610 provides access to heating chamber 208 and filament spools 904 and 906 stored within the heating chamber 902. Towpregs 908 may also be stored within heating chamber 902 adjacent to filament spools 904 and 906. The heating chamber 902 comprises insulation lining 912 that lines and encapsulates heated air produced by the heater fan unit from top assembly 630. The heater fan unit is mounted above the heating chamber 902 such that heated air is circulated from the top assembly 630 to the bottom assembly 640.

The heater fan unit may be configured to heat the air within the heating chamber 902 and maintain an air temperature within the heating chamber 902 at a given configurable temperature (e.g., based on filament material setting) to remove moisture from and prevent moisture accumulation on filaments held in filament spools 904 and 906. The dryer system 600 may further include an interlock thermostat that de-energizes a heater component of the heater fan unit when, for example, the temperature within heating chamber 902 exceeds 95° C.-107° C. The dryer system 600 may further include an interlock fuse that cuts power to the heater fan unit when the temperature within the heating chamber 902 exceeds, for example, 107° C.-137° C. or if the heater fan assembly 202 draws power that exceeds a given threshold.

In certain embodiments, dryer door 610 may be configured in a closed position with door latch 612 and lock 910 in order for the heater fan unit to activate. Dryer system 600 may also include a magnetic reed switch that detects whether the dryer door 610 is closed and de-energizes the heater fan unit when the dryer door 610 is not closed or locked.

Referring to FIG. 10, dryer system 600 includes a slide-in design that enables ease of access with enough space for two spool holders 1002 and 1004 that can hold, for example, two one kilogram filament rolls, and towpreg holders 1006 that can hold, for example, two rolls of tape. Filament rolls may be loaded on spool holders 1002 and 1004 without unraveling. Optionally, towpreg holders 1006 may be removed to may space for larger filament rolls, e.g., 2.2 kilogram rolls. Referring to FIG. 11, channels 1102 and 1104 comprise pathways for heated air from the heater fan unit of top assembly 630 to enter into the heating chamber 902 of bottom assembly 640 which is discussed in further detail regarding the description of FIG. 12.

Figure 12:
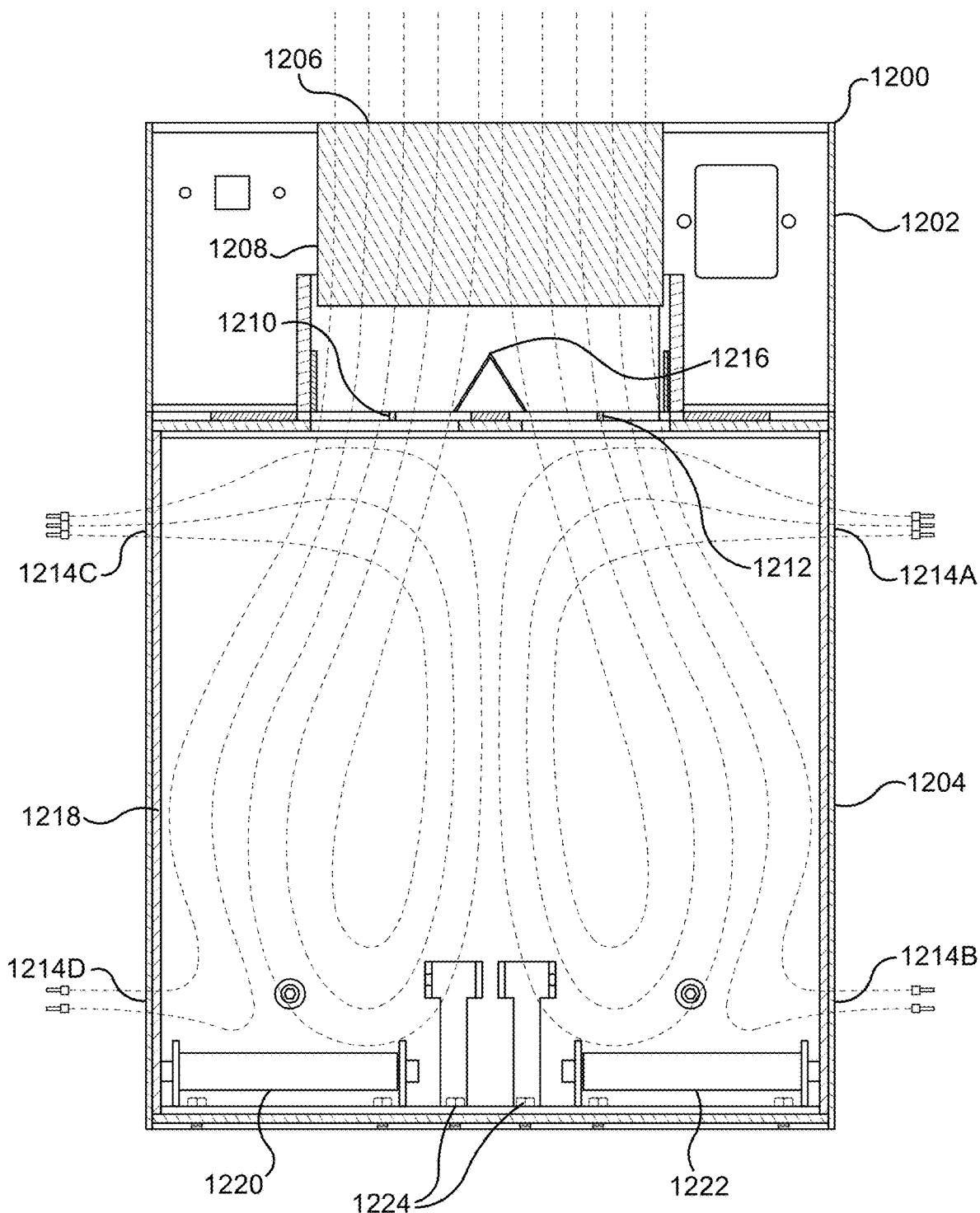
FIG. 12 illustrates an air circulation diagram of a filament dryer according to an embodiment of the present invention.

FIG. 12 presents an air circulation diagram of a filament dryer according to an embodiment of the present invention. The arrows depicted in FIG. 12 are representative of air flow with respect to a dryer system 1200. Dryer system 1200 comprises a convection-style circulation system that conditions the air within heating chamber 1218 such that most of the moisture from the air is forced out while maintaining some moisture to keep filament at its peak performance. The dryer system 1200 includes a top assembly 1202 containing a top-down heater fan unit 1208 that draws room temperature air in at heater intake fan grille 1206. The top-down heater fan unit 1208 benefits from rising hot air and prevents temperature gradients as opposed to a heater fan mounted at the bottom of bottom assembly 1204 where cold spots may be created above the heater zone. Heated air from the heater fan unit 1208 is blown towards a diverter 1216 to split the heated air into channels 1210 and 1212 such that the heated air is blown at an outwards angle towards the side walls of heating chamber 1218 in the bottom assembly 1204. The diverter 1216 may be triangularly-shaped or angularly slanted to circulate the heated air by utilizing natural convection.

The air is then deflected from the sidewalls of heating chamber 1218 towards the position of stored spool filaments mounted on spool filament holders 1220 and 1222. A portion of the air directed at the spool filament holders 1220 and 1222 may be vented out at exhaust ports 1214B and 1214D and another portion of the air may circulate (e.g., by force of the heater fan unit 1208) upwards along the towpreg holders 1224. At least a portion of the air circulated upwards is vented out through exhaust ports 1214A and 1214C. Additionally, a slight gap may exist to leak out from a door at the bottom assembly 1204 to prevent overheating of the heating chamber 1218.

Figure 13:
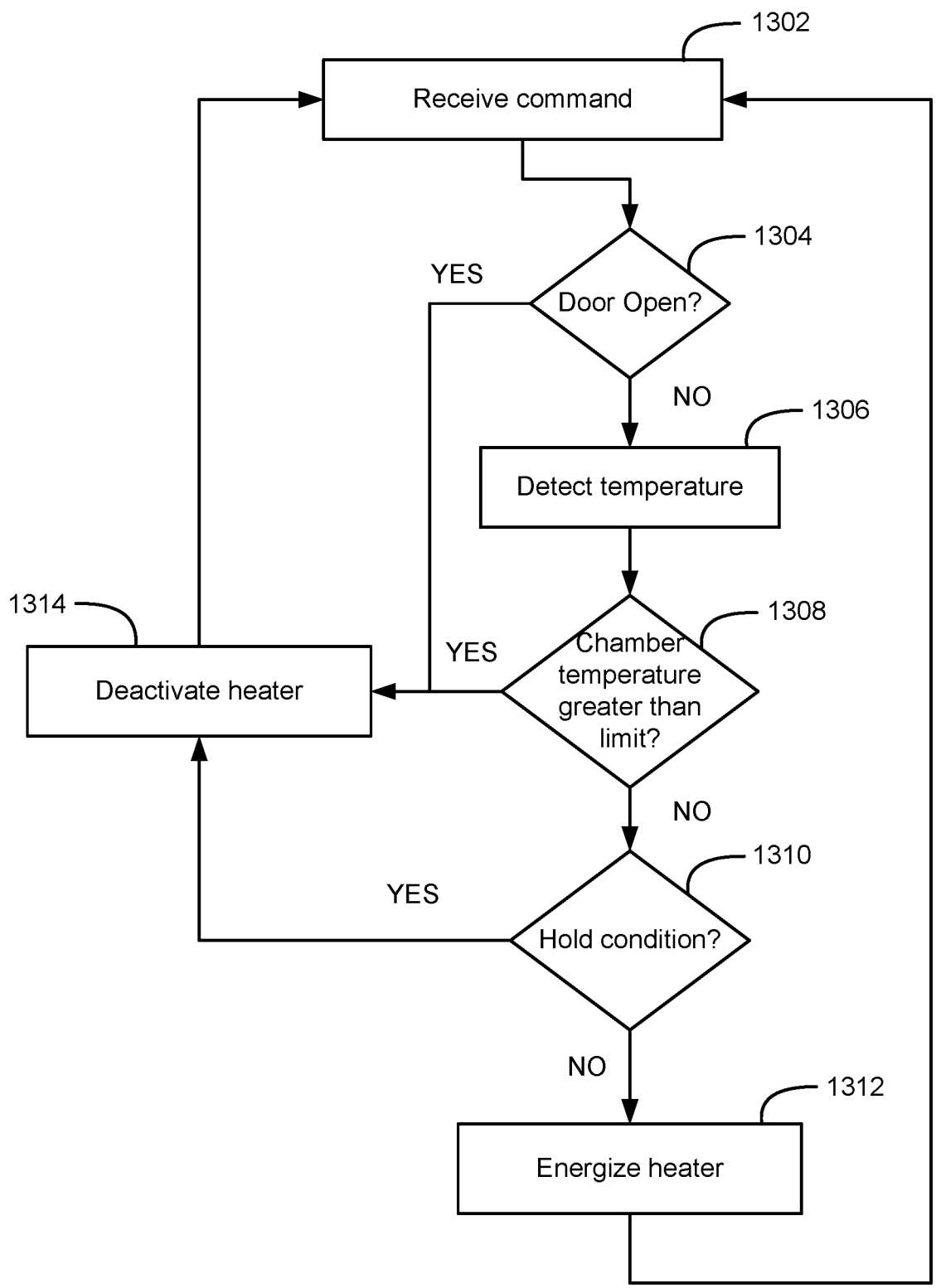
FIG. 13 illustrates a flowchart of a method for heating filaments according to an embodiment of the present invention.

FIG. 13 presents a flowchart of a method for heating filaments according to an embodiment of the present invention. The method may be performed by a computing device of a dryer system. The dryer system may be designed for continuous use wherein 3D printing filaments may be stored in the drying unit on a long-term basis. Upon starting a cycle, a graphical display or touch screen may prompt the user to verify that there is nothing blocking the fan intake and exhaust ports, and that the door is properly closed.

When the dryer system is in operation or turned on, the computing device may continually listen or monitor for commands entered via an input device, such as a touch screen. A command is received, step 1302. Prior to carrying out the received command, the computing device toggles activation of a heater in the dryer system based on a determination of whether a position of a door to a heating chamber of the dryer system is open, step 1304. If the door is open, the heater in the dryer system is deactivated, step 1314 and the computing device returns to step 1302 and listens for an additional command. Additionally, the computing device may generate a message on a display or touch screen that the door is open. The computing device may continuously listen for an additional command and generate a message on the display or touch screen that the door is open until the door is close.

When the computing device detects that the door is not open, the computing device proceeds to detect a temperature within the heating chamber of the dryer system, step 1306. According to one embodiment, temperature probes may be installed to provide temperature readings of the heating chamber to the computing device. The computing device may check a reading of the temperature probes and determine whether the heating chamber temperature is greater than an operating temperature limit (e.g., 95° C.-107° C.), step 1308. If the heating chamber temperature is greater than the limit, the heater is deactivated, step 1314.

If the computing device determines that the heating chamber temperature is not greater than the limit, the computing device proceeds to control operation of the heater based on a determination of whether a hold condition is satisfied based on the received command and the detected temperature, step 1310. The received command may include a selection of a material preset or setting that is preconfigured with specific drying parameters for a given filament material (e.g., active temperature, active duration, hold temperature, and hold duration). The command may also include a manual command to set the active temperature, active duration, hold temperature, and hold duration. Manual commands may be stored or preset into an electrically erasable programmable read-only memory ("EEPROM") or other non-volatile memory, to save the manual commands as an option, even during power cycles.

The drying parameters may include a heating temperature and time for active drying a given filament material and one or more hold cycles to prevent excess moisture from collecting in the heating chamber, which ensures that the material is kept dry. For example, the drying parameters may instruct the computing device to actively heat the heating chamber to a proper heating temperature (e.g., 75° C.) for a given amount of time and once the heating chamber has been heated at the proper heating temperature for the given amount of time, the heating chamber is maintained in a hold cycle at a given hold temperature that may be below the heating temperature (e.g., 50° C.).

The computing device may determine whether a hold condition is satisfied by comparing the detected temperature of the heating chamber and the duration in which the heating chamber was maintained at the detected temperature of the heating chamber with drying parameters associated with the received command. The holding condition may also be changed, for example, if an active cycle is initiated based on the received command. In the case where the computing device determines that the hold condition is not satisfied for the received command, a heating mode is entered and causes the computing device to energize the heater, step 1312. The heating mode may activate the heater to continuously operate according to an active cycle or a hold cycle. The computing device will then proceed to step 1302 to listen for an additional command. If the computing device determines that the hold condition is satisfied for the received command, a hold cycle is entered and causes the computing device to deactivate the heater, step 1314, which then proceeds to step 1302 to listen for an additional command.

FIGS. 1 through 13 are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps). In software implementations, computer software (e.g., programs or other instructions) and/or data is stored on a machine-readable medium as part of a computer program product and is loaded into a computer system or other device or machine via a removable storage drive, hard drive, or communications interface. Computer programs (also called computer control logic or computer-readable program code) are stored in a main and/or secondary memory, and executed by one or more processors (controllers, or the like) to cause the one or more processors to perform the functions of the invention as described herein. In this document, the terms "machine readable medium," "computer-readable medium," "computer program medium," and "computer usable medium" are used to generally refer to media such as a random access memory (RAM); a read only memory (ROM); a removable storage unit (e.g., a magnetic or optical disc, flash memory device, or the like); a hard disk; or the like.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

What is claimed is:

1. An apparatus for heating three-dimensional printing filaments, the apparatus comprising:
    a heating chamber including an insulation lining and spool holders mounted at a base of the heating chamber;
    a heater fan assembly mounted above the heating chamber, the heater fan assembly comprising a powered fan and heater configured to heat air and circulate the heated air to the heating chamber;
    a diverter situated between the heater fan assembly and the heating chamber, the diverter splitting and directing the heated air to the heating chamber through a pair of channels;
    a plurality of exhaust ports at top sidewall portions and bottom sidewall portions of the heating chamber, the plurality of exhaust ports allowing the heated air to escape from the heating chamber; and
    fitting adapters comprising apertures that allow filament material to be dispensed from the heating chamber.

2. The apparatus of claim 1 further comprising a computing device configured to control operations of the heater fan assembly.

3. The apparatus of claim 2 wherein the computing device is configured to utilize and operate the heater fan assembly to heat the air and maintain an air temperature within the heating chamber at a given configurable temperature based on a material setting or a user-defined setting.

4. The apparatus of claim 2 further comprising a touch screen that allows user interaction with the computing device to control heating modes and the operation of the heater fan assembly.

5. The apparatus of claim 4 wherein the touch screen is configured to present a graphical user interface including at least one of presets, dryer status, countdown timer, current and setpoint temperature, and a logo.

6. The apparatus of claim 1 wherein the heater fan assembly includes an air filter.

7. The apparatus of claim 1 further comprising a dryer door that provides access to the heating chamber.

8. The apparatus of claim 7 further comprising an interlock that toggles activation of the heater fan assembly based on a configuration of the dryer door.

9. The apparatus of claim 1 wherein the diverter splits and directs the heated at an outwards angle towards sidewalls of the heating chamber.

10. The apparatus of claim 1 wherein the diverter is triangularly-shaped or angularly slanted.

* * * * *